United States Patent Office 3,645,931
Patented Feb. 29, 1972

3,645,931
BLOWING AGENT COMPOSITIONS
James K. Normanton, Bishop Auckland, Durham, England, assignor to Bakelite Xylonite Limited
No Drawing. Filed July 22, 1969, Ser. No. 843,768
Claims priority, application Great Britain, July 19, 1968, 34,509/68
Int. Cl. C08f *29/04, 47/10;* C09k *3/00*
U.S. Cl. 260—2.5 R                  8 Claims

ABSTRACT OF THE DISCLOSURE

Blowing agent compositions comprising azodicarbonamide and a secondary blowing agent adaptable for expanding plastic materials.

BACKGROUND OF THE INVENTION

(1) Field of the invention

This invention relates to blowing agent compositions suitable for expanding plastic materials, and to the production of expanded plastic materials using such compositions.

(2) Description of the prior art

It is well known to produce expanded plastic materials, for instance, thermoplastic materials such as vinyl chloride or ethylene polymers, by incorporating a chemical compound which, on heating to a sufficiently high temperature, liberates or generates a gas such that bubbles or the like are formed in the plastic material, thereby expanding it. In general, the chemical compounds are incorporated in the plastic materials at a temperature below that at which they will decompose. Thereafter, the resulting composition is subjected to the desired forming step, for example, calendering, molding or extruding, and expansion is achieved by increasing the temperature of the composition, either during these operations, or after these operations have been completed. The gas generating chemical compounds employed for this purpose are commonly referred to as blowing aegnts, and this expression is used herein.

A wide variety of blowing agents are known. Originally, they comprised inorganic salts such as bicarbonates which liberate carbon dioxide on heating, but such compounds liberate only limited quantities of gas under pressure. For this reason, a considerable number of organic compounds have been developed for use as blowing agents such as, for example, p,p'-oxy-bis-(benzene sulphonylhydrazide), benzene sulphonylhydrazide, benzil hydrazone, azodiisobutyric nitrile and azodicarbonamide, all of which compounds are capable of liberating gases at their respective decomposition temperatures.

Despite the fact that many different blowing agents are available, it is recognized in the art that, in many instances, especially for particular applications calling for specific properties, the known agents are not entirely satisfactory, often giving rise to processing difficulties and resulting in expanded products with undesirable properties due to characteristics of the blowing agent and/or its decomposition products. In this connection, azodicarbonamide, in many ways a highly effective blowing agent (for example, it has an excellent expanding power and the gas evolution is gentle), gives rise on decomposition to products which can adversely effect both the processing of the composition and the expanded product itself. These decomposition products, which are believed to consist essentially of cyanuric acid, can interact with the metal surfaces of the internal parts of the machinery, say an extruder, used in the forming operation. This results in the formation of a colored crust on these parts. This phenomenon is known in the art as "plate-out." Ultimately, the crust residue interferes with the forming operation, so that it is necessary to clean the parts of the machinery at periodic intervals, and this not only interrupts the processing schedule but is time-consuming and tedious. Further, in those instances in which the product is formed by extrusion, the crust residue results in extruded profiles having impaired surface characteristics, such as roughness and irregular shapes.

SUMMARY OF THE INVENTION

In the formation of blown plastics azodicarbonamide is used in conjunction with certain secondary blowing agents.

An object of the present invention is to provide a novel blowing agent system for plastic materials.

Another object of the present invention is to provide a blowing agent system for plastic materials which is capable of avoiding "plate-out."

A further object of the present invention is to provide expanded plastics which are devoid of "plate-out" effects.

DESCRIPTION OF THE PREFERRED EMBODIMENT

It has now been found that some other organic blowing agents when included along with azodicarbonamide in plastic materials, eliminate entirely or at least markedly reduce the incidence of "plate-out" associated with the use of azodicarbonamide alone, and, consequently, provide a superior expanded product.

Accordingly, the present invention, in one of its aspects, resides in a blowing agent composition comprising azodicarbonamide as a primary blowing agent and one or more secondary blowing agents selected from those organic compounds which decompose on heating to evolve gaseous products containing elemental nitrogen and which have a higher decomposition temperature than azodicarbonamide.

Preferably, the composition contains a major proportion by weight (i.e., >50% by weight) of azodicarbonamide and a minor proportion by weight (i.e., <50% by weight) of one or more of the secondary blowing agents.

THE BLOWING AGENTS

The preferred composition according to this invention comprises a major proportion by weight of azodicarbonamide and a minor proportion by weight of trihydrazino-sym-triazine, as the secondary blowing agent. The latter material has an optimum decomposition temperature in the range 265 to 290° C. Azodicarbonamide has a decomposition temperature range of 190 to 230° C. The gaseous decomposition products of trihydrazino-sym-triazine include nitrogen. Advantageously, the ratio in parts by weight of the azodicarbonamide to the trihydrazino-sym-triazine, or other secondary blowing agent, in the mixture is in the range 60:1 to 1.01:1, and more preferably 6:1 to 3:1, respectively.

EXPANDABLE PLASTIC COMPOSITIONS

The blowing agent compositions provided by this invention are intended for use in the production of expanded plastic materials. Thus, the compositions of this invention also include expandable compositions which comprise the blowing agent composition and at least one expandable resin, preferably thermoplastic resin, such as polymers or copolymers derived from vinyl chloride, vinyl acetate, vinylidene chloride, styrene, ethylene, propylene, butadiene, chloroprene, acrylonitrile, acrylates and methacrylates and the like. The compositions may further include cross-linked polymeric systems based on the above polymers or copolymers, such as when the expansion is conducted during cross-linking of the polymers or copolymers. The resin/blowing agent combination is selected so that the blowing agent composition decomposes at a temperature at which the resin is in a suitable condition for expansion.

The amount of the blowing agent mixture included in the expandable compositions of the present invention, i.e. those containing a resin, may vary over a wide range depending, among other things, on the degree of expansion sought and the intended end use for the expanded product. Generally, the amounts used are in the range of about 0.1 to about 25 parts by weight per 100 parts by weight of expandable polymer. Most usually, the amount employed falls within the range 0.5 to about 10 parts by weight, per 100 parts by weight of the expandable resin. The amount of blowing agent to be used is that which would be required to provide a degree of expansion in the expandable compositions or polymers of about 30 to 55%.

ADJUVANTS

In those instances in which the compositions contain a resin, such as a vinyl polymer or a polyamide, which is normally plasticized to facilitate the forming operation, the compositions may include a suitable plasticizer for such polymers. As examples of suitable plasticizers for particular resins, say vinyl chloride polymers, mention may be made of dioctyl phthalate, butyl nonyl phthalate, dioctyl sebacate, tricresyl phosphate, trixylenyl phosphate and dodecyl adipate. The compositions may additionally contain secondary plasticizers.

Furthermore, in addition to the plasticizers, the expandable resin containing compositions of the present invention may include one or more other adjuvants or additives conventionally employed in resin technology such, for example, as modifiers, opacifiers, fillers, lubricants, stabilizers, pigments and dyes.

The adjuvants or additives selected for use in each case are those which are normally employed with the particular type of expandable plastic being used. The adjuvants would be used in amounts which would be effective for the intended purpose. Thus, plasticizers would be used in a plasticizingly effective quantity and fillers would be used in effective quantities therefor. For example, if a reinforcing filler were to be used, such filler would be used in such amounts as to provide the desired reinforcing effect.

PROCESSING

The expandable compositions may be formed by mixing together the various components in any convenient way such as by blending on a conventional open-roll mill or in an internal mixer such as a Banbury mill.

The expandable compositions are transformed into the desired expanded, i.e. cellular, products, by one of a number of processes all of which involve, at some stage or other, heating the compositions to a temperature which is sufficiently high to decompose the blowing agents. When the blowing agent mixture comprises azodicarbonamide and trihydrazino-sym-triazine, for example, a temperature in excess of 175° C. normally gives satisfactory results but will vary with the formulation and type of resin employed. For instance, the composition may be expanded by part filling a mold with the composition, closing the mold, heating the mold to decompose the blowing agents and expand the resinous material. Alternatively, the expansion may be effected by fully filling a mold with the composition, closing the mold and heating it under pressure to decompose the blowing agents, cooling the mold, removing the product and heating it at a temperature at which it becomes plastic and expands. The second stage heating may be carried out in any suitable way such as for instance in an oven, or in the open in hot air, oil or steam. Again, in extrusion processes, the composition may be passed through the heated barrel of an extruder under pressure. In this barrel, the blowing agents decompose but, because of the pressure under which composition is maintained, expansion does not take place until the composition emerges through the extrusion die, when it may, for example, be brought into contact with an electrical conductor such as copper wire. In yet another expansion procedure, the composition may simply be heated to decompose the blowing agents and expand the resin. Thus, the composition may be spread on a metal plate, a release paper, a sheet of plastic, for example a sheet of polyvinyl chloride or a fabric backing, and the heating accomplished statically or on a moving belt passing through an oven.

The following examples in which all parts are by weight, illustrate the present invention. The melt flow index describes the flow behavior of a polymer at a specified temperature and under a specified pressure. The values quoted in the examples, and elsewhere in this application, are determined by measuring the flow rate, expressed in grams per 10 minutes, according to the procedure of British Standard 2782, part 1, 1965, Method 105C.

EXAMPLE 1

Part (a)

An expandable composition of the following formulation was prepared.

| Component: | Content |
|---|---|
| Low density polyethylene (density 0.928; melt flow index 1.0) | 0.6 |
| Azodicarbonamide | 0.6 |
| Trihydrazino-sym-triazine | 0.1 |

The components were thoroughly mixed in a Banbury mixer, and the mixture passed through a two-roll mill operating at a front roll pressure of 50 pounds per square inch gauge (p.s.i.g.) (steam) at 148° C. and a back roll pressure of 35 p.s.i.g. (steam) at 138° C. to form a sheet approxiamtely 0.125″ thick. The sheet coming from the mill was cooled, and then fed to a dicing machine in which it was reduced to ⅛″ cubes. The cubes were then fed into a 2″ extruder fitted with a standard wire crosshead and a die with a single circular 0.030″ diameter aperture operating at a temperature of around 230° C., a compression ratio of 4:1 and a screw speed of 50 r.p.m. The molten expandable composition on emerging from the die contacted a 0.020″ diameter copper wire, preheated to 100° C. and travelling at 2,500 feet per minute. With the change in pressure on emerging from the die, the composition expands to provide a cellular covering. The covered wire was taken through a water bath maintained at 20° C. located in front of the die so that the travel of the wire from the die to the cooling medium is about 12″. The cellular covering had a density (at 20° C.) of 0.6 gm./cc. and a radial thickness of 0.008″, corresponding to a degree of expansion of around 36%.

Part (b)

An expandable composition of the following formulation was prepared.

| Component: | Content |
|---|---|
| Low density polyethylene (density 0.928; melt flow index 1.0) | 100 |
| Azodicarbonamide | 0.6 |
| Di-butyl-p.-cresol | 0.2 |

This (b) composition was prepared and then extruded, and expanded, around a copper wire following the same procedure as set forth in part (a).

Part (c)

An expandable composition of the following formulation was prepared.

| Component: | Content |
|---|---|
| Low density polyethylene (density 0.928; melt flow index 1.0) | 100 |
| Azodicarbonamide | 0.6 |
| p,p-Oxy-bis(benzene sulphonyl hydrazide) | 0.1 |
| Di-butyl-p.-cresol | 0.2 |

In the (c) formulation, the secondary blowing agent, i.e. p,p-oxy-bis(benzene sulphonyl hydrazide), has a lower decomposition temperature (150–160° C.) than the azodicarbonamide.

This (c) composition was prepared and then extruded, and expanded, around a copper wire following the same procedure as set forth in part (a).

The insulated wire obtained from Parts (a) and (c) of the example was examined after processing had been under way for four hours, and some of the relevant observations are recorded in Table I which follows:

TABLE I

| Feature | Part (a) | Part (b) | Part (c) |
|---|---|---|---|
| "Plate-out" | None | Very marked especially on final channels and screw flights. | Moderate amount especially on final channels and screw flights. |
| Surface characteristics | Smooth both to the eye and touch | Markedly rough and significant eccentricity. | Fairly rough. |
| Cellular characteristics | Fine cell structure with regular cell distribution and relatively uniform cell size. Predominant cell size diameter 0.0008 to 0.0012". | Fine and uniform cell structure | Coarse, uneven cell structure. Average cell diameter >0.003". |

The results reported show that the combination of good processing properties (partly reflected in the absence of "plate-out") and good cellular characteristics is obtained only with the expandable composition of part (a) which contains a major amount of azodicarbonamide and a minor amount of trihydrazino-sym-triazine. In this way, the trihydrazino-sym-triazine improves the suitability of azodicarbonamide as a blowing agent.

EXAMPLE 2

(Part a)

An expandable composition of the following formulation was prepared.

| Component: | Content |
|---|---|
| High density polyethylene ("Rigidex 9", specific gravity 0.96 melt flow index 0.9—homopolymer) | 100 |
| Azodicarbonamide | 0.6 |
| Trihydrazino-sym-triazine | 0.2 |

The expandable composition set out above was extruded using a 2" extruder for four hours at an extrusion melt temperature of 240° C. At the end of the four hour period the flights and final channels of the extruder were carefully examined. It was noted that negligible "plate-out" had occurred.

Part (b)

The procedure of Example 2(a) was repeated with the high density polyethylene being replaced by "GWE 21" a propylene homopolymer manufactured by I.C.I. Ltd., and having a specific gravity of 0.905 and a melt flow index of 3.0. The composition was extruded at an extrusion melt temperature of 226° C. It was again seen that negligible "plate-out" had occurred during extrusion.

Part (c)

The procedure of Example 2(b) was repeated with the high density polyethylene being replaced by "KMT 61" a propylene copolymer manufactured by Shell Chemicals Ltd., and having a specific gravity of 0.908 and a melt flow index of 3.0. The composition was extruded at an extrusion melt temperature of 225° C. Again little or no "plate-out" occurred.

Parts (d)(e) and (f)

The procedures of Examples 2(a), (b) and (c) were repeated with omission of the trihydrazino-sym-triazine. In all three cases marked "plate-out" deposits were noted on the final channels and flights of the extruder screw.

Part (g)

When the procedure of Example 2(a) was repeated using p-toluene sulphonyl semicarbazide as the secondary blowing agent, it was noted that appreciable "plate-out" still occurred in the extruder.

The blowing agent systems of the invention can be used for cross-linked polymeric systems as well as thermoplastic systems such as where the expansion of the polymeric system is conducted during cross-linking of the polymers. Examples of suitable cross-linkable polymer systems which could be used are polymers or copolymers derived from olefins such as ethylene and propylene.

What is claimed is:

1. A blowing agent composition comprising a major portion by weight of azodicarbonamide and a minor portion by weight of trihydrazino-sym-triazine.

2. A blowing agent composition as in claim 1 in which said azodicarbonamide and said trihydrazino-sym-triazine are present in a weight ratio of 60:1 to 1.01:1, respectively.

3. An expandable composition comprising expandable resin and blowing agent effective quantities therefor of a blowing agent composition comprising a major portion by weight of azodicarbonamide and a minor portion by weight of trihydrazino-sym-triazine.

4. An expandable composition as in claim 3 in which said expandable resin comprises at least one thermoplastic resin.

5. An expandable composition as in claim 4 in which said thermoplastic resin is an olefin polymer.

6. An expandable composition as in claim 3 in which said azodicarbonamide and said trihydrazino-sym-triazine are present in a weight ratio of 60:1 to 1.01:1, respectively.

7. An expandable composition as in claim 3 in which said azodicarbonamide and said trihydrazino-sym-triazine are present in a weight ratio of 6:1 to 3:1, respectively.

8. A blowing agent composition as in claim 2 in which said azodicarbonamide and said trihydrazino-sym-triazine are present in a weight ratio of 6:1 to 3:1, respectively.

References Cited

UNITED STATES PATENTS

| 3,211,677 | 10/1965 | Feild et al. | 260—2.5 P |
| 3,278,466 | 10/1966 | Cram et al. | 260—2.5 P |
| 3,393,260 | 7/1968 | Miler | 260—2.5 E |

MURRAY TILLMAN, Primary Examiner

W. J. BRIGGS, SR., Assistant Examiner

U.S. Cl. X.R.

117—232; 252—350; 260—2.5 E, 94.9 GD

PO-1050
(5/69)

UNITED STATES PATENT OFFICE
CERTIFICATE OF CORRECTION

Patent No. 3,645,931    Dated February 29, 1972

Inventor(s) James K. Normanton

It is certified that error appears in the above-identified patent and that said Letters Patent are hereby corrected as shown below:

Column 1, line 42, "aegnts" should read -- agents --.

Column 4, line 31, "0.6" should read -- 100 --.

Signed and sealed this 18th day of July 1972.

(SEAL)
Attest:

EDWARD M. FLETCHER, JR.    ROBERT GOTTSCHALK
Attesting Officer          Commissioner of Patents